(12) United States Patent
Hermann et al.

(10) Patent No.: US 9,209,631 B2
(45) Date of Patent: *Dec. 8, 2015

(54) CHARGE RATE MODULATION OF METAL-AIR CELLS AS A FUNCTION OF AMBIENT OXYGEN CONCENTRATION

(71) Applicant: Tesla Motors, Inc., Palo Alto, CA (US)

(72) Inventors: Weston Arthur Hermann, Palo Alto, CA (US); Jeffrey Brian Straubel, Woodside, CA (US); David G. Beck, Tiburon, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 595 days.

This patent is subject to a terminal disclaimer.

(21) Appl. No.: 13/624,900

(22) Filed: Sep. 22, 2012

(65) Prior Publication Data

US 2013/0015823 A1    Jan. 17, 2013

Related U.S. Application Data

(62) Division of application No. 12/887,557, filed on Sep. 22, 2010, now Pat. No. 8,423,215.

(60) Provisional application No. 61/372,351, filed on Aug. 10, 2010.

(51) Int. Cl.
*H02J 7/00* (2006.01)
*B60L 11/18* (2006.01)
(Continued)

(52) U.S. Cl.
CPC ............ *H02J 7/0029* (2013.01); *B60L 1/003* (2013.01); *B60L 1/02* (2013.01); *B60L 3/003* (2013.01); *B60L 3/0061* (2013.01); *B60L 11/1803* (2013.01); *B60L 11/1809* (2013.01); *B60L 11/1816* (2013.01); *B60L 11/1846* (2013.01); *B60L 11/1851* (2013.01); *B60L 11/1857* (2013.01); *B60L 11/1861* (2013.01); *B60L 11/1864* (2013.01); *B60L 11/1868* (2013.01); *B60L 11/1874* (2013.01); *B60L 11/1875* (2013.01); *H01M 10/443* (2013.01); *H01M 10/5004* (2013.01); *H01M 10/5022* (2013.01); *H01M 10/613* (2015.04); *H01M 10/633* (2015.04); *H01M 16/00* (2013.01); *H01M 16/006* (2013.01); *B60L 2210/30* (2013.01); *B60L 2240/12* (2013.01); *B60L 2240/14* (2013.01); *B60L 2240/36* (2013.01);
(Continued)

(58) Field of Classification Search
CPC ...................................................... H02J 7/0029
USPC .......................... 320/137, 147, 162, 132, 134
See application file for complete search history.

(56) References Cited

U.S. PATENT DOCUMENTS 5,898,282 A     4/1999   Drozdz et al.
5,902,467 A *   5/1999   Wang et al. .................... 204/415
(Continued)

OTHER PUBLICATIONS

Boyd, Steven J., "Hybrid Electric Vehicle Control Strategy Based on Power Loss Calculations," Virginia Polytechnic Institute and State University, 2006, 67 pages.

*Primary Examiner* — Edward Tso
*Assistant Examiner* — Aaron Piggush
(74) *Attorney, Agent, or Firm* — J. Richard Soderberg

(57) ABSTRACT

A method for charging a metal-air battery pack at the maximum possible rate while maintaining an ambient oxygen concentration below a preset concentration is provided, thereby minimizing the risks associated with generating oxygen during the charging cycle.

12 Claims, 9 Drawing Sheets

(51) Int. Cl.
*H01M 10/44* (2006.01)
*H01M 10/613* (2014.01)
*H01M 10/633* (2014.01)
*H01M 16/00* (2006.01)
*B60L 1/00* (2006.01)
*B60L 1/02* (2006.01)
*B60L 3/00* (2006.01)
*H02J 7/14* (2006.01)
*H01M 10/6561* (2014.01)
*H01M 10/6567* (2014.01)
*H01M 12/06* (2006.01)

(52) U.S. Cl.
CPC ...... *B60L 2240/421* (2013.01); *B60L 2240/545* (2013.01); *B60L 2240/547* (2013.01); *B60L 2240/662* (2013.01); *B60L 2250/12* (2013.01); *H01M 10/5063* (2013.01); *H01M 10/5075* (2013.01); *H01M 10/6561* (2015.04); *H01M 10/6567* (2015.04); *H01M 12/06* (2013.01); *H02J 7/14* (2013.01); *Y02E 60/12* (2013.01); *Y02T 10/7005* (2013.01); *Y02T 10/7011* (2013.01); *Y02T 10/7066* (2013.01); *Y02T 10/7258* (2013.01); *Y02T 90/16* (2013.01)

(56) References Cited

U.S. PATENT DOCUMENTS

| | | | |
|---|---|---|---|
| 5,905,360 A | 5/1999 | Ukita | |
| 6,163,131 A * | 12/2000 | Gartstein et al. | 320/118 |
| 6,687,581 B2 | 2/2004 | Deguchi et al. | |
| 6,793,027 B1 | 9/2004 | Yamada et al. | |
| 6,955,861 B2 | 10/2005 | Yoshizawa et al. | |
| 7,349,797 B2 | 3/2008 | Donnelly et al. | |
| 7,435,492 B2 | 10/2008 | Ovshinsky et al. | |
| 7,532,960 B2 | 5/2009 | Kumar | |
| 7,641,009 B2 | 1/2010 | Akimoto | |
| 7,933,695 B2 | 4/2011 | Yamaguchi | |
| 8,102,155 B2 | 1/2012 | Muraoka et al. | |
| 8,180,512 B2 * | 5/2012 | Kelty et al. | 701/22 |
| 8,190,320 B2 | 5/2012 | Kelty et al. | |
| 8,324,862 B2 | 12/2012 | Ridder et al. | |
| 8,557,414 B2 * | 10/2013 | Hermann et al. | 429/50 |
| 2003/0106726 A1 | 6/2003 | Yoshii | |
| 2005/0052080 A1 | 3/2005 | Maslov et al. | |
| 2008/0027639 A1 * | 1/2008 | Tryon | 701/209 |
| 2008/0245587 A1 | 10/2008 | Sastry et al. | |
| 2009/0322503 A1 | 12/2009 | Suzuki et al. | |
| 2010/0138142 A1 * | 6/2010 | Pease | 701/123 |
| 2010/0174484 A1 | 7/2010 | Sivasubramaniam et al. | |
| 2012/0073525 A1 | 3/2012 | Owens | |
| 2013/0328531 A1 * | 12/2013 | Hermann et al. | 320/137 |

* cited by examiner

CHARGE RATE MODULATION OF METAL-AIR CELLS AS A FUNCTION OF AMBIENT OXYGEN CONCENTRATION

CROSS-REFERENCE TO RELATED APPLICATION

The present application is a divisional of U.S. patent application Ser. No. 12/887,557, filed 22 Sep. 2010, which claims benefit of the filing date of U.S. Provisional Patent Application Ser. No. 61/372,351, filed Aug. 10, 2010, the disclosure of which is incorporated herein by reference for any and all purposes.

FIELD OF THE INVENTION

The present invention relates generally to batteries and, more particularly, to means for minimizing the flammability risks associated with metal-air cells.

BACKGROUND OF THE INVENTION

A metal-air cell is a type of electro-chemical battery that utilizes the same energy storage principles as a more conventional cell such as a lithium ion, nickel metal hydride, nickel cadmium, or other cell type. Unlike such conventional cells, however, a metal-air cell utilizes oxygen as one of the electrodes, typically passing the oxygen through a porous metal electrode. Due to the use of oxygen as one of the reactants, such cells have some rather unique properties. For example, since the oxygen does not need to be packaged within the cell, a metal-air cell typically exhibits a much higher capacity-to-volume, or capacity-to-weight, ratio than other cell types making them an ideal candidate for weight sensitive applications or those requiring high energy densities.

The exact nature of the reaction that occurs in a metal-air battery depends upon the metal used in the anode and the composition of the electrolyte. Exemplary metals used in the construction of the anode include zinc, aluminum, magnesium, iron, lithium and vanadium. The cathode in such cells is typically fabricated from a porous structure with the necessary catalytic properties for the oxygen reaction. A suitable electrolyte, such as potassium hydroxide in the case of a zinc-air battery, provides the necessary ionic conductivity between the electrodes while a separator prevents short circuits between the battery electrodes.

Regardless of the composition and mechanical nature of the elements used in a metal-air battery, oxygen is required for the reaction to take place. Therefore during the discharge cycle, the reaction rate of the cell may be varied by controlling the flow of oxygen into the cell. During the charging cycle, the metal oxides or ions are reduced to form the metal comprising the anode and oxygen is emitted by the cell.

While metal-air cells offer a number of advantages over a conventional rechargeable battery, most notably their extremely high energy density, such cells also have a number of drawbacks. For example, care must be taken to avoid undesired electrolyte water loss, especially in high temperature, low humidity environments. More importantly, care must be taken to insure a sufficient supply of air to the cells during discharge cycles, and means for handling the oxygen emitted from the cells during the charge cycles, both of these issues becoming increasingly important as the number of metal-air cells and/or the size of the cells increase to meet the demands of larger applications. The present invention provides a method and apparatus for meeting some of these demands.

SUMMARY OF THE INVENTION

The present invention provides a method for charging a metal-air battery pack at the maximum possible rate while maintaining an ambient oxygen concentration below a preset concentration, thereby minimizing the risks associated with generating oxygen during the charging cycle.

In at least one embodiment of the invention, a method of charging a metal-air battery pack is provided, the method comprising the steps of coupling the metal-air battery pack to an external charging source; determining the oxygen concentration level within a first region; comparing the oxygen concentration level to a preset level; initiating charging if the oxygen concentration is less than the preset level; suspending charging if the oxygen concentration exceeds the preset level; and resuming charging when the oxygen concentration falls below the preset level. The method may further comprise the steps of determining the present battery pack state-of-charge (SOC); comparing the present SOC to a target SOC; and terminating charging when the present SOC reaches or exceeds the target SOC. The method may further comprise the steps of comparing the oxygen concentration level to a second preset level, where the second preset level is lower than the first level; charging the battery pack at a first charge rate if the oxygen concentration level is less than said second preset level; and charging the battery pack at a second charge rate if the oxygen concentration level is greater than the second preset level and less than the first preset level. The method may further comprise the step of activating a warning system (e.g., auditory, visual, notification system, etc.) if the oxygen concentration level exceeds the preset level. The method may further comprise the steps of determining a second oxygen concentration level corresponding to a second region, where the first region corresponds to the battery pack oxygen outlet and the second region corresponds to an external vehicle sensing location; comparing the second oxygen concentration level to the preset level; and suspending charging if the second oxygen concentration level exceeds the preset level. The method may further comprise the steps of determining a second oxygen concentration level corresponding to a second region, where the first region corresponds to the battery pack oxygen outlet and the second region corresponds to an external vehicle sensing location; comparing the second oxygen concentration level to a second preset level, where the second concentration level may be less than the first preset level; and suspending charging if the second oxygen concentration level exceeds the second preset level. The method may further comprise the steps of monitoring a plurality of oxygen concentration levels at a plurality of locations, and averaging the plurality of oxygen concentration levels to obtain the oxygen concentration level used in the methodology of the invention. The step of initiating charging may further comprise the step of applying a charging profile, preferably where the charging profile is selected from a plurality of stored charging profiles based on a set of initial charging conditions.

A further understanding of the nature and advantages of the present invention may be realized by reference to the remaining portions of the specification and the drawings.

DESCRIPTION OF THE SPECIFIC EMBODIMENTS

Figure 1:
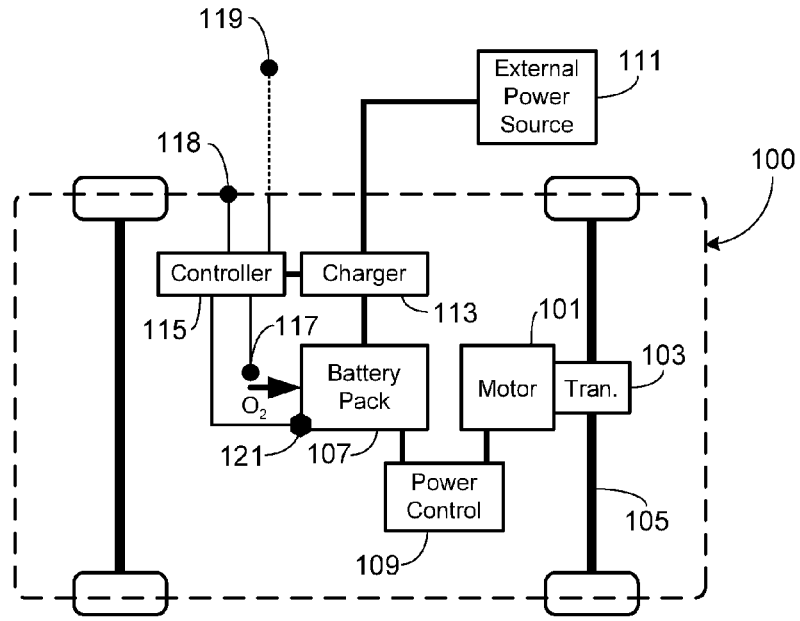
FIG. 1 illustrates the basic elements of a charging control system for a metal-air battery pack in accordance with the invention.

In the following text, the terms "battery", "cell", and "battery cell" may be used interchangeably. The term "battery pack" as used herein refers to multiple individual batteries contained within a single piece or multi-piece housing, the individual batteries electrically interconnected to achieve the desired voltage and capacity for a particular application. The terms "battery" and "battery system" may be used interchangeably and as used herein refer to an electrical energy storage system that has the capability to be charged and discharged such as a battery or battery pack. The term "electric vehicle" as used herein refers to either an all-electric vehicle, also referred to as an EV, plug-in hybrid vehicles, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Given the high energy density and the large capacity-to-weight ratio offered by metal-air cells, they are well suited for use in electric vehicles, either as a stand-alone electrical power source or in conjunction with one or more other power sources, for example, a lithium ion battery pack. Regardless of whether a vehicle uses a metal-air battery pack alone or in combination with another battery pack, the size of the metal-air battery pack in either configuration is likely to be quite large. As a result, during battery charging a large amount of oxygen is expected to be generated. For example, assuming a 100 kWh metal-air battery pack, during charging such a pack will release approximately 19 cubic meters of oxygen. As a consequence, in a relatively small confined region such as a single car garage, the charging of such a battery pack can easily double the oxygen concentration from the normal concentration of 20.95% to over 40%, both concentrations being expressed relative to other compounds within the air. Accordingly, charging a large metal-air battery pack in a confined area can increase the oxygen concentration dramatically, thereby decreasing the lower explosive limit or lower flammable limit (LEL/LFL) of vapors within the confined region (e.g., gasoline used in a lawn mower stored in the garage), decreasing the autoignition temperature (AIT) of combustible materials contained within the same confined region (e.g., garage construction materials as well as various items/materials possibly stored within the garage), and similarly decreasing the flash point of liquids stored within the same confined region (e.g., cleaning supplies stored within the garage). As such it will be appreciated that care must be taken during charging to avoid reaching unsafe oxygen concentrations.

The system disclosed herein is used to insure that charging the metal-air battery pack does not cause the oxygen concentration in the surrounding environment to increase beyond a preset limit. The limit used herein is a maximum oxygen concentration of 25% in air. It should be appreciated, however, that the invention may be used with other maximum oxygen concentrations, as such concentration limits may be set by regional, state or federal governments or other parties tasked with setting various safety regulations.

Figure 2:
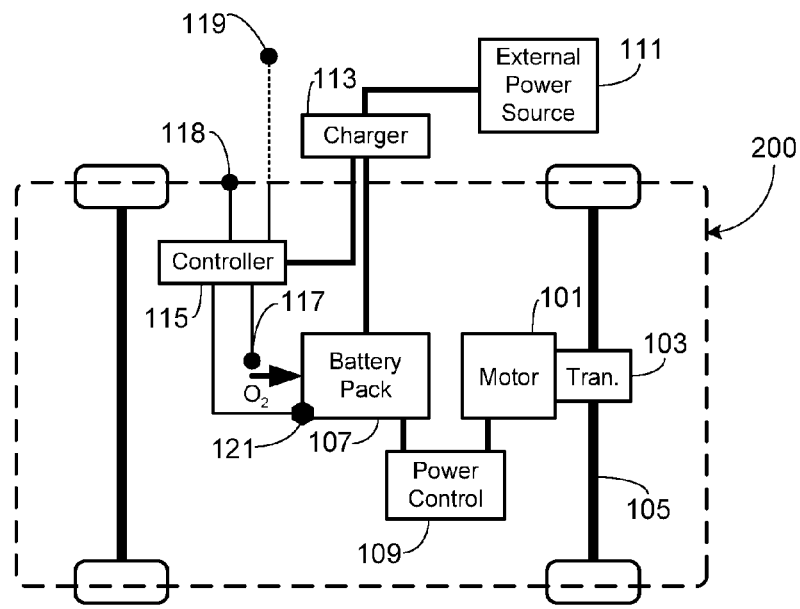
FIG. 2 illustrates an alternate charging control system.

FIGS. 1 and 2 illustrate the basic elements of a metal-air charge control system in accordance with the invention. In vehicle 100, the drive system uses a single electric motor 101 coupled, for example via a transmission/differential assembly 103, to axle 105. It will be appreciated that the invention is equally applicable to vehicles using multiple motors coupled to one or both axles. Similarly, the invention is not limited to a specific type/configuration of transmission (e.g., single speed, multi-speed) or a specific type/configuration of differential (e.g., open, locked or limited slip).

Battery pack 107, comprised of metal-air cells, provides electrical power to motor 101. While the invention may be used with vehicles that utilize both a metal-air battery pack and at least one other battery pack, e.g., a lithium-ion battery pack, secondary battery packs are not shown in the illustrations. Additionally it should be understood that a vehicle may utilize multiple metal-air battery packs, for example to distribute the weight throughout the vehicle. The present invention is equally applicable to such configurations. Battery pack 107 is coupled to motor 101 via a power control module 109, module typically including a DC to AC converter. Power control module 109 insures that the power delivered to motor 101 has the desired voltage, current, waveform, etc. As such, power control module 109 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

During battery pack charging, battery pack 107 is coupled to an external power source 111 (e.g., wall socket, dedicated charging station, etc.) via charging circuit 113. A controller 115, coupled to charger 113, controls operation of the charger, preferably controlling not only its status (on/off), but also its charge rate. Preferably controller 115 is built-in to charger 113, although it can be separate. Note that charger 113 can be mounted within the vehicle as illustrated in FIG. 1, or external to the vehicle as shown relative to vehicle 200 illustrated in FIG. 2. In the embodiment illustrated in FIG. 2, controller 115 may be external to the vehicle, although it is preferably internal to the vehicle as shown, thus allowing the vehicle to be charged in a variety of situations with various chargers while still retaining the benefits of the invention as described more fully below.

Controller 115 is coupled to one or more oxygen sensors, controller 115 receiving data signals from the sensors that correspond to oxygen concentration levels. In at least one embodiment, controller 115 is coupled to an oxygen sensor 117 that is mounted in close proximity to battery pack 107, and preferably mounted in close proximity to the channel or channels where the oxygen generated during the charging cycle is emitted, or mounted in close proximity to the battery pack inlet channel or channels. Note that in some configurations, the same channel or channels may be used to receive oxygen, for example from the ambient atmosphere, during discharge cycling, as well as for oxygen emission during the charging cycles. In at least one embodiment, instead of an oxygen sensor 117 which is mounted proximate to the battery pack, or in combination with sensor 117, controller 115 is coupled to an oxygen sensor 118 that is mounted at some distance from the battery pack. The purpose of sensor 118 is to provide a value for the oxygen concentration that is more representative of the ambient environment, rather than the environment immediately surrounding the battery pack. Sensor 118 may be mounted within the passenger compartment, under the vehicle and exposed to the underside environment, or mounted to some other location (e.g., within a bumper, within the grill, near a body panel juncture to allow the sensor to be hidden, etc.). In addition to sensors 117 and 118, or as a replacement for one or both sensors 117 and 118, the vehicle may be coupled to an externally mounted sensor 119, sensor 119 being mounted within the garage or other charging location (e.g., a charging bay). Preferably the electrical interconnect to couple sensor 119 to controller 115 is contained within the same plug/jack arrangement that is used to couple the vehicle to the external charging station, thus simplifying coupling.

Figure 3:
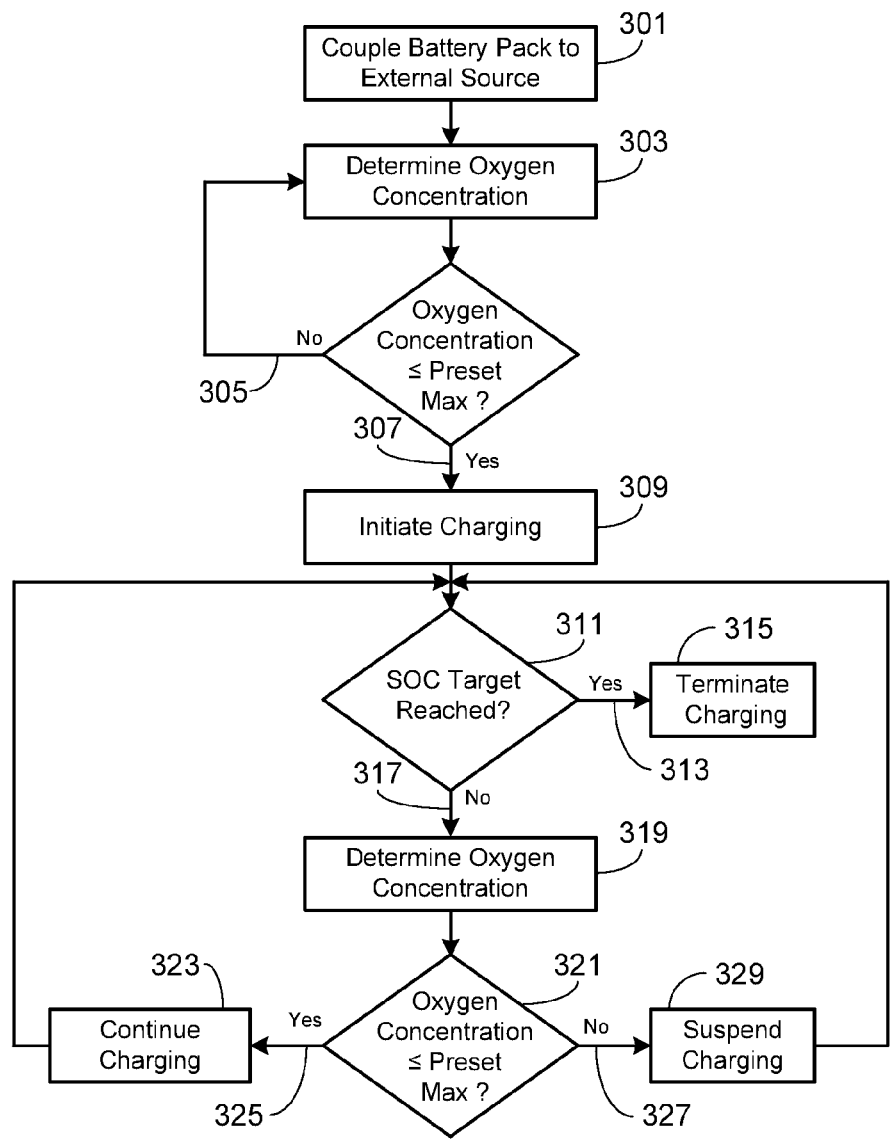
FIG. 3 illustrates the methodology of the invention in accordance with one preferred embodiment.

FIG. 3 illustrates the basic methodology of the invention. As illustrated, once the battery pack/vehicle is coupled to an external power source (step 301), the oxygen concentration is determined, for example using one or more sensors 117-119 (step 303). If the oxygen concentration is greater than the preset value (step 305), charging is not initiated. If the oxygen concentration is less than the preset maximum allowed oxygen value (step 307), charging is initiated (step 309).

After charging has been initiated and throughout the charging cycle, controller 115 preferably monitors the state-of-charge (SOC) of the battery pack via SOC detection system 121, and compares the monitored SOC with a target SOC (step 311). Once the target SOC is reached (step 313), charging is terminated (step 315). If the target SOC has not been reached (step 317), controller 115 continues to monitor oxygen concentration (step 319) using one or more sensors 117-119, comparing the monitored level to the preset maximum level (step 321). Charging continues (step 323) as long as the oxygen concentration remains below the allowed limit (step 325). If the oxygen concentration increases beyond the allowed maximum (step 327), charging is suspended (step 329). Once suspended, controller 115 continues to monitor the oxygen concentration. Once the oxygen concentration falls below the preset level, charging resumes.

Figure 4:
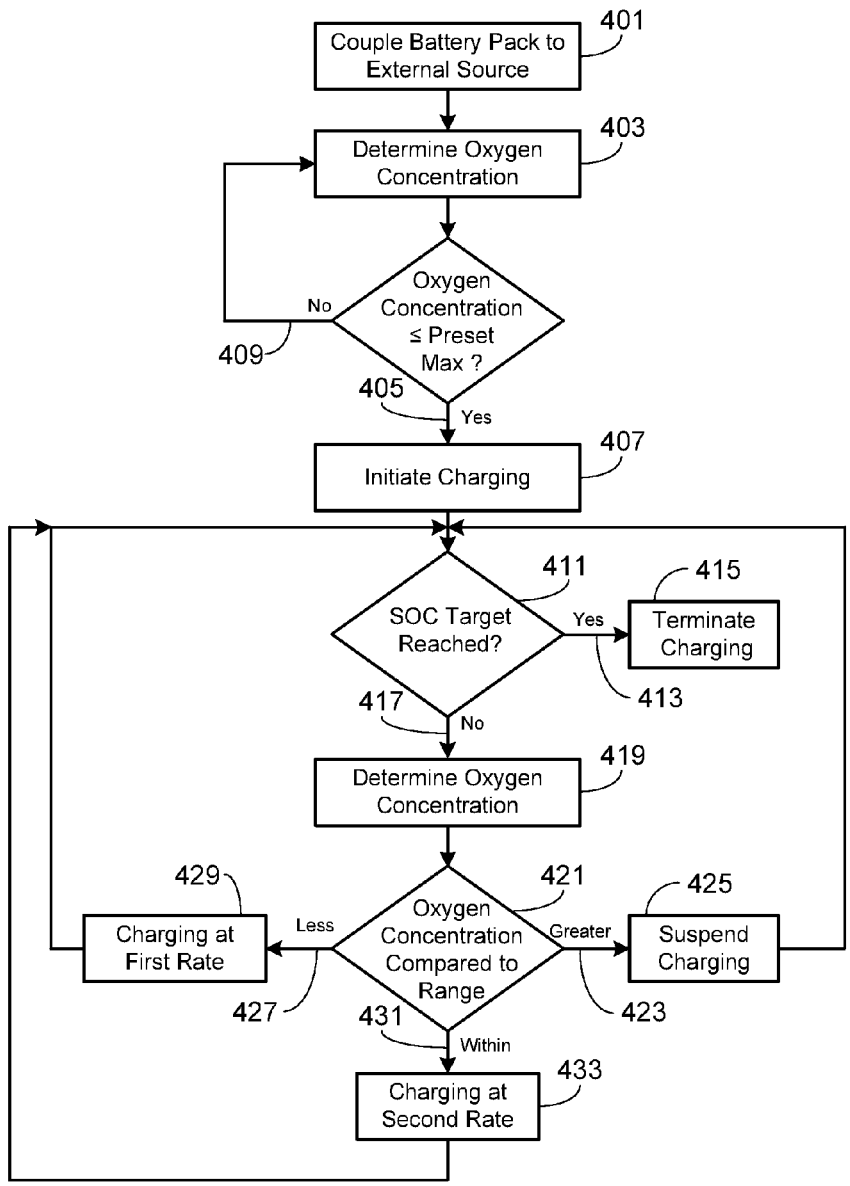
FIG. 4 illustrates the methodology of the invention in accordance with an alternate preferred embodiment.

In a minor variation of this methodology, and as illustrated in FIG. 4, the charging rate, and thus the rate of oxygen generation, is controlled by controller 115, rather than simply determining whether or not to charge the battery pack based on oxygen levels. As in the previous process, once the battery pack is coupled to the external source (step 401), oxygen concentration is determined via one or more sensors 117-119 (step 403). If the oxygen level is below the preset value (step 405), charging is initiated (step 407). If the oxygen level is above the preset value (step 409), charging is not initiated and oxygen concentration continues to be monitored.

Throughout the charging cycle, preferably controller 115 compares the SOC of the battery pack with a target SOC (step 411). Once the target SOC is reached (step 413), charging is terminated (step 415). If the target SOC has not yet been reached (step 417), oxygen concentration continues to be monitored (step 419). The monitored oxygen concentration level is compared to an oxygen concentration range (step 421). If the monitored oxygen concentration increases beyond the preset range (step 423), charging is suspended (step 425) and the system continues to monitor oxygen levels to determine when charging may be resumed. If the monitored oxygen level is below the preset range (step 427), charging continues at a first charging rate (step 429). For example, the first charging rate may be the maximum charge rate. If the monitored oxygen level is within the preset range (step 431), charging continues at a second charging rate (step 433). Typically the second charging rate is a reduced rate.

Figure 5:
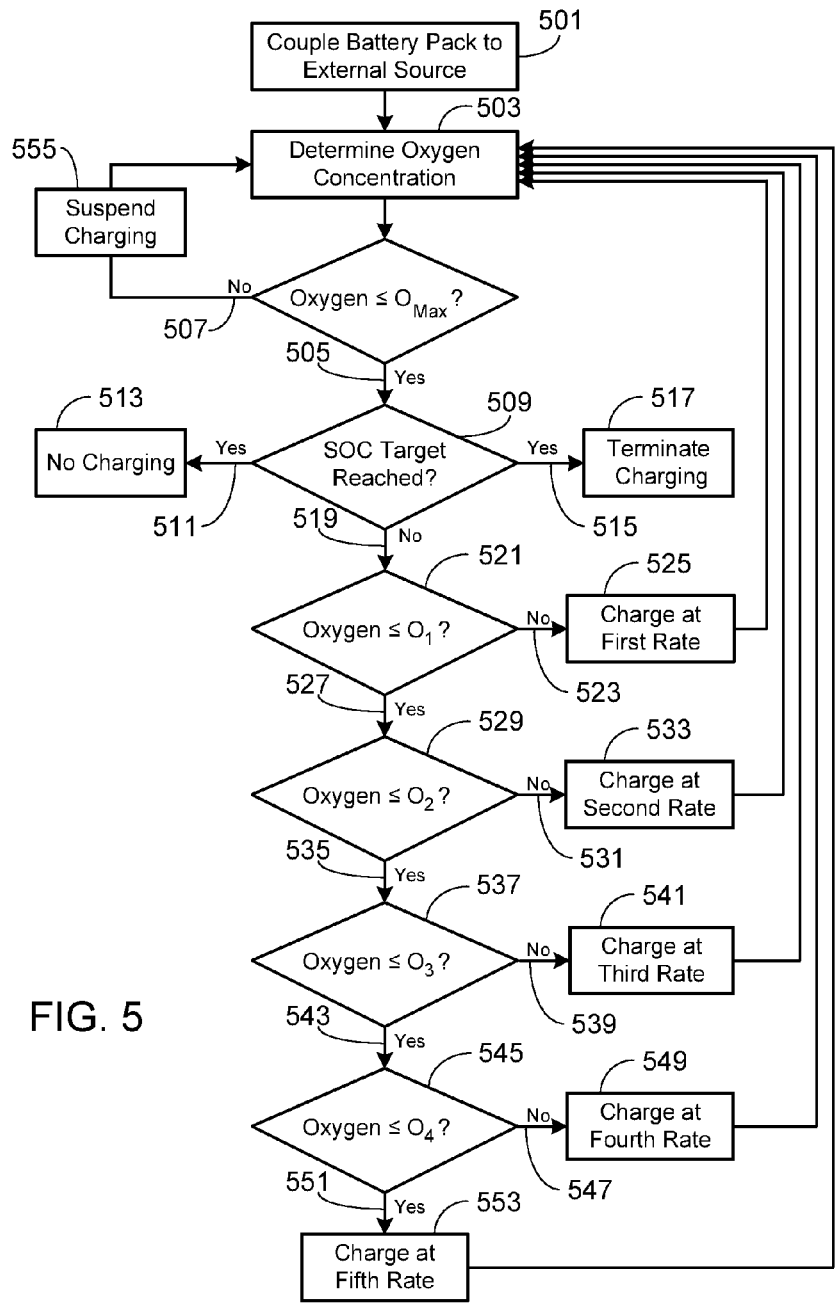
FIG. 5 illustrates an alternate methodology in which multiple charge rates are applied, based on monitored oxygen concentration levels.

While the process illustrated in FIG. 4 and discussed above includes only two charge rates, it will be appreciated that the system of the invention may be used with more than two rates. In this case, the charging system/controller selects the appropriate charging rate based on the monitored oxygen concentration. This aspect of the invention is illustrated in FIG. 5. As in the previously described processes, once the battery pack is coupled to the external source (step 501), oxygen concentration is determined via one or more sensors 117-119 (step 503). If the oxygen concentration level is less than the preset maximum allowed concentration (step 505), the process is allowed to continue. An exemplary preset maximum oxygen concentration is 25%, although it should be understood that this value is only meant to illustrate the invention and that the inventors envision the use of other maximum oxygen concentrations. If the oxygen level is above the preset value (step 507), charging is not initiated and oxygen concentration continues to be monitored.

Preferably prior to initiating charging, controller 115 compares the SOC of the battery pack with a target SOC (step 509). If the current SOC is equal to or greater than the target SOC (step 511), charging is not initiated (step 513). Similarly, if at any time during the charging cycle the target SOC is reached (step 515), charging is terminated (step 517). It will be appreciated that the SOC measuring and comparison steps may occur at other locations within the process, for example after charging initiation.

If the target SOC has not yet been reached (step 519), the monitored oxygen concentration is compared to a first target oxygen concentration level, $O_1$ (step 521). If the monitored oxygen concentration level is between the preset maximum and level $O_1$ (step 523), controller 115 applies a first charging rate (step 525). If the monitored oxygen concentration level is less than level $O_1$ (step 527), the monitored oxygen concentration is compared to a second target oxygen concentration level, $O_2$ (step 529). If the monitored oxygen concentration level is between level $O_1$ and level $O_2$ (step 531), controller 115 applies a second charging rate (step 533). Preferably the second charge rate is greater than the first charge rate. If the monitored oxygen concentration level is less than level $O_2$ (step 535), the monitored oxygen concentration is compared to a third target oxygen concentration level, $O_3$ (step 537). If the monitored oxygen concentration level is between level $O_2$ and level $O_3$ (step 539), controller 115 applies a third charging rate (step 541). Preferably the third charge rate is greater than the second charge rate. If the monitored oxygen concentration level is less than level $O_3$ (step 543), the monitored oxygen concentration is compared to a fourth target oxygen concentration level, $O_4$ (step 545). If the monitored oxygen concentration level is between level $O_3$ and level $O_4$ (step 547), controller 115 applies a fourth charging rate (step 549). Preferably the fourth charge rate is greater than the third charge rate. If the monitored oxygen concentration level is less than level $O_4$ (step 551), controller 115 applies a fifth charging rate (step 553). Preferably the fifth charge rate is the maximum charge rate. For purposes of this exemplary configuration, oxygen concentrations of 25%, 24%, 23%, 22% and 21% may be used for levels $O_{max}, O_1, O_2, O_3,$ and $O_4$, respectively. Clearly other oxygen concentration levels are envisioned by the inventors. It will be appreciated that this methodology, and the invention, may be used with a fewer number, or a greater number, of charge rates.

Throughout the process shown in FIG. 5, the oxygen concentration levels continue to be monitored (step 503), for example using one or more sensors 117-119. This allows the charge rate to be varied, either to a higher charge rate or a lower charge rate, depending upon oxygen concentration. If at any time the monitored oxygen concentration level exceeds the preset maximum level, $O_{max}$, charging is suspended (step 555).

In at least one embodiment of the invention, controller 115 learns from past charging cycles, thus allowing further optimization of the charging rate. This approach is best suited when a user repeatedly charges their vehicle at the same location (e.g., home garage), thus encountering the same, or similar, charging conditions during each charging cycle. In order to determine if the charging location is the same, the user may be required to activate a 'HOME' button, thus allowing controller 115 to recognize that the charging location is a routine location. Alternately, controller 115 may be coupled to the vehicle's GPS system, thus allowing controller 115 to determine the charging location, and whether the current charging location is the same as a previous charging location. The advantage of this approach is that it eliminates the need for user interaction, i.e., no need to identify the charging location. Additionally, this approach allows the system to recognize multiple charging locations (e.g., work, home, etc.).

Figure 6:
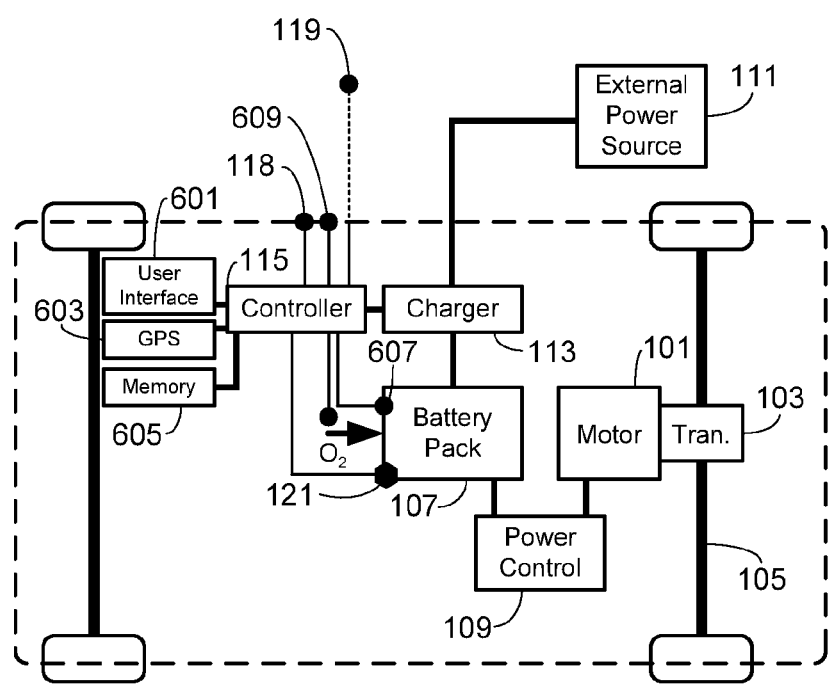
FIG. 6 illustrates an alternate charging control system that stores previous charging cycles, thus allowing charging cycle optimization.
Figure 7:
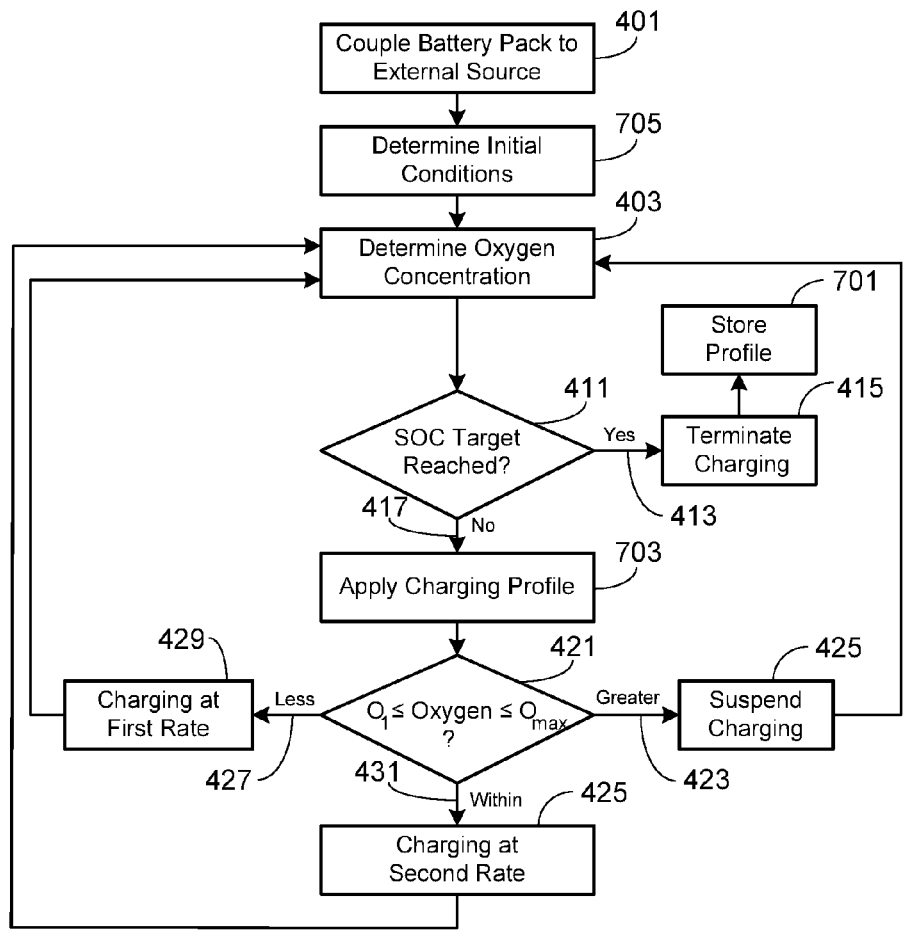
FIG. 7 illustrates an alternate methodology based on the system shown in FIG. 6.

While any of the embodiments described above may be used with a learning system, the exemplary embodiment shown in FIG. 6 is based on vehicle 100. The exemplary methodology described in FIG. 7 is based on the embodiment described above and shown in FIG. 4. As shown in FIG. 6, controller 115 is coupled to one or both of (i) a user location input interface 601 and (ii) a GPS system 603. Preferably input interface 601 is part of the vehicle's user interface. Alternately, it may be a button or other input means located on the dash, keyfob, etc. A memory 605, coupled to controller 115, stores past charging profiles. Memory 605 may be comprised of EPROM, EEPROM, flash memory, RAM, a solid state disk drive, a hard disk drive, or any other memory type or combination of memory types.

Preferably each time the vehicle is charged, or at least each time the vehicle is charged in a routine charging location (e.g., home garage), controller 115 stores the charging profile in memory 605 (step 701). Typically the charging profile includes initial SOC, final SOC, total charge time, charge time at each charge rate, and the specifics associated with each time that charging was suspended due to the oxygen concentration exceeding the preset maximum. Then the next time that charging is attempted at the same location, controller 115 applies a modified charging profile based on the previous profile for this location (step 703). Typically the modified profile applied in step 703 is designed to lower the charge rate immediately before the occurrence of a charging suspension as indicated by the prior charging profile, thereby allowing charging to continue without disruption.

In the embodiment illustrated in FIGS. 6 and 7, preferably controller 115 only applies the modified charging profile in step 703 if the initial vehicle conditions match, or match within a specified tolerance, the initial vehicle conditions from the stored profile. For example, if the initial SOC was 35%, the initial oxygen concentration was 21%, the battery temperature was 65° C., and the ambient temperature was 20° C., preferably controller 115 only applies a pre-defined charging profile based on the stored profile if the current conditions match, or match within a preset tolerance range (e.g., the variable in question plus/minus 3%). Accordingly, preferably one of the first steps in the process is to determine the initial conditions (step 705), conditions such as current SOC, battery temperature, ambient temperature, etc.

As the preferred embodiment of this system only applies a pre-defined charging profile if the current conditions closely match the initial conditions of the pre-defined profile, preferably in addition to SOC sensor 121, controller 115 is also coupled to, and obtains data from, at least one battery temperature sensor 607 and at least one ambient temperature sensor 609.

It should be understood that the system described above may also be used to store multiple charging profiles, not only for multiple locations, but also for the same location but with different initial conditions. As a result, preferably in step 703 controller 115 determines if any of the charging profiles stored in memory 605 may be applied during the current charging cycles, based on the initial conditions, and applies the best profile based on the closest fit of conditions. Once applied, preferably controller 115 continues to monitor oxygen concentration, comparing the monitored concentration to one or more preset levels, thus insuring that the applied profile still maintains the oxygen concentration within the preset levels. In the exemplary embodiment shown in FIG. 7, based on the methodology described in FIG. 4, the monitored oxygen concentration level is compared to a range of levels (step 421). The same approach may be used with fewer (e.g., FIG. 3) or greater (FIG. 5) oxygen level presets.

Figure 8:
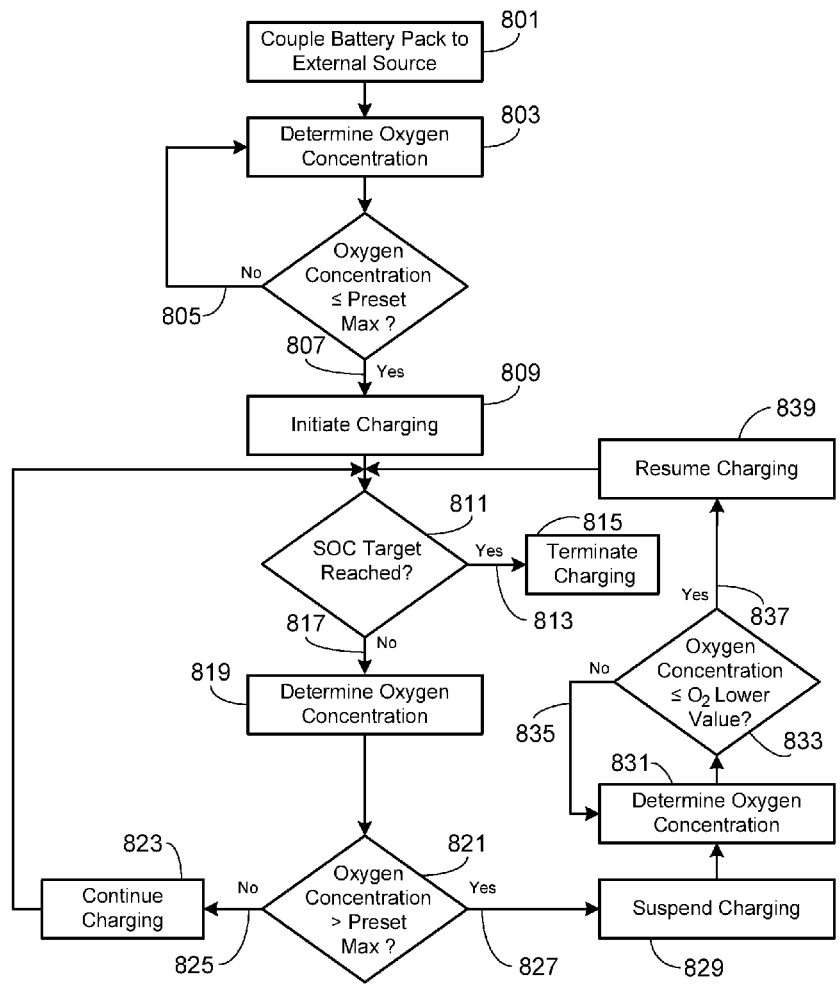
FIG. 8 illustrates an alternate methodology in accordance with another embodiment of the invention.

FIG. 8 illustrates an alternate methodology, based on the methodology described above relative to FIG. 3. As described earlier, once the battery pack is coupled to the external source (step 801), oxygen concentration is determined via one or more sensors 117-119 (step 803). If the oxygen level is below the preset value (step 805), charging is initiated (step 807). If the oxygen level is above the preset value (step 809), charging is not initiated and oxygen concentration continues to be monitored.

After charging has been initiated and throughout the charging cycle, controller 115 preferably monitors the battery pack SOC, comparing the monitored SOC to a target SOC (step 811). Once the target SOC is reached (step 813), charging is terminated (step 815). If the target SOC has not been reached (step 817), controller 115 continues to monitor oxygen concentration (step 819) using one or more sensors 117-119, comparing the monitored level to the preset maximum level (step 821). Charging continues (step 823) as long as the oxygen concentration remains below the allowed limit (step 825) and the SOC target has not been reached. If the oxygen concentration increases beyond the allowed maximum (step 827), charging is suspended (step 829). Once suspended, controller 115 continues to monitor the oxygen concentration (step 831), comparing the monitored oxygen concentration level with a second preset oxygen concentration level (step 833). The second preset oxygen concentration level is lower than the preset maximum allowed level applied in step 821. For example, if the first preset value (i.e., the preset maximum oxygen concentration level) is 25%, a suitable second preset value (i.e., the preset lower oxygen concentration level) may be 23% or 24%. It will be appreciated that these values are only provided as examples, and the inventors clearly envision applying other values. As long as the monitored oxygen concentration remains higher than the second preset value (step 835), charging remains suspended. Once the oxygen concentration falls below the second preset level (step 837), charging resumes (step 839).

As previously described, controller 115 may be coupled to one or more oxygen concentration sensors, the sensors being located at various locations, thus insuring that the oxygen concentration within all areas remain within the desired safety range. It will be appreciated that the oxygen concentration during charging will typically be greatest at the battery pack oxygen outlet, and will decrease with distance from the oxygen outlet. Additionally, the oxygen concentration decreases based on the volume of air into which the oxygen outlet is coupled, and based on the level of mixing that occurs with the ambient environment. Thus oxygen concentration will exceed the acceptable level quicker in a single garage of 3,750 cubic feet then in a double garage of 7,500 cubic feet. Similarly, the oxygen concentration will exceed the acceptable level quicker in a closed garage than in an open garage.

As described above with respect to sensors 117-119, the system may monitor the oxygen concentration with multiple sensors, thus taking into account the expected oxygen concentration variations based on proximity to the battery pack oxygen outlet and the conditions of the ambient environment. In at least one embodiment of the invention, associated with each sensor is a corresponding maximum concentration level, this maximum level used in determining whether or not to proceed with charging (e.g., step 321 of the process illustrated in FIG. 3). This allows the acceptable concentration level to be preset for each particular sensor, thus taking into account the sensors location. Thus, for example, the acceptable oxygen concentration level at sensor 117, monitoring the battery pack outlet, may be set at a relative concentration level of 28% while the concentration level outside of the vehicle, for example monitored by a sensor 118, may be set at a relative concentration level of 25%. Clearly this approach may be used with more than two sensors, for example a sensor 117 mounted near the battery pack oxygen outlet, a sensor 118 mounted on an external vehicle surface, and a sensor 119 mounted within the charging bay (e.g., garage). Additionally, it will be appreciated that multiple sensors may be mounted at approximately the same relative position, thus allowing oxygen concentration values to be averaged for a particular location. Alternately, the highest monitored value may be used when multiple sensors are co-located.

In an alternate embodiment utilizing multiple sensors, e.g., sensors 117-119, an algorithm is used to weight the oxygen concentration level determined for each sensor. The weighted concentration value is then used in determining whether to continue or suspend charging, or in determining the charging rate to be applied. For example, the oxygen concentration level near the battery pack may be given twice the weighting as the output from a sensor 118 monitoring external vehicle concentration levels, thus insuring that even if the concentration level in the charging bay is kept to an acceptable level (for example by leaving the garage door open), the charging levels near the vehicle, which may not be subject to the same level of ambient air mixing, do not reach a dangerous level.

Figure 9:
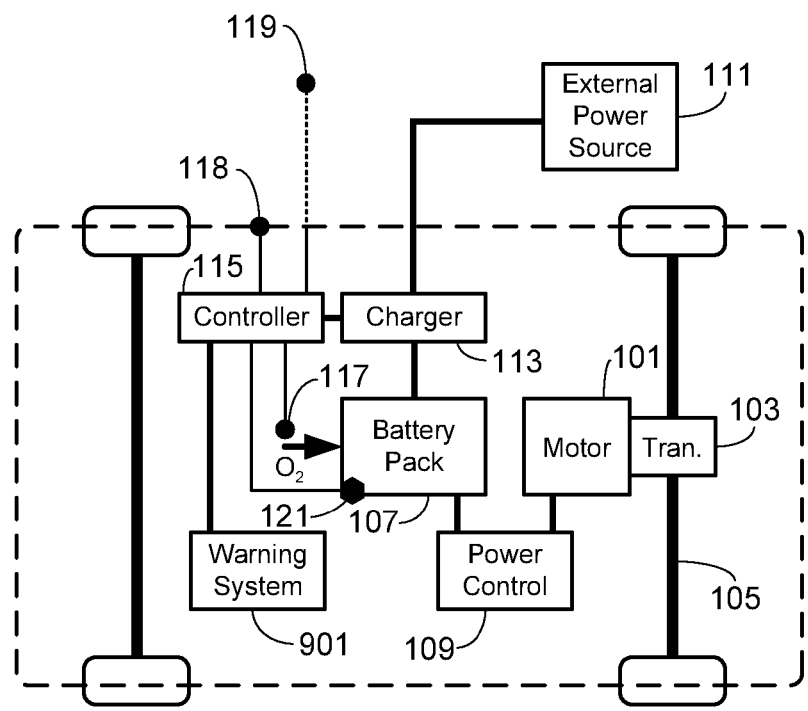
FIG. 9 illustrates a charging control system based on the system shown in FIG. 1, with the addition of a user warning system.
Figure 10:
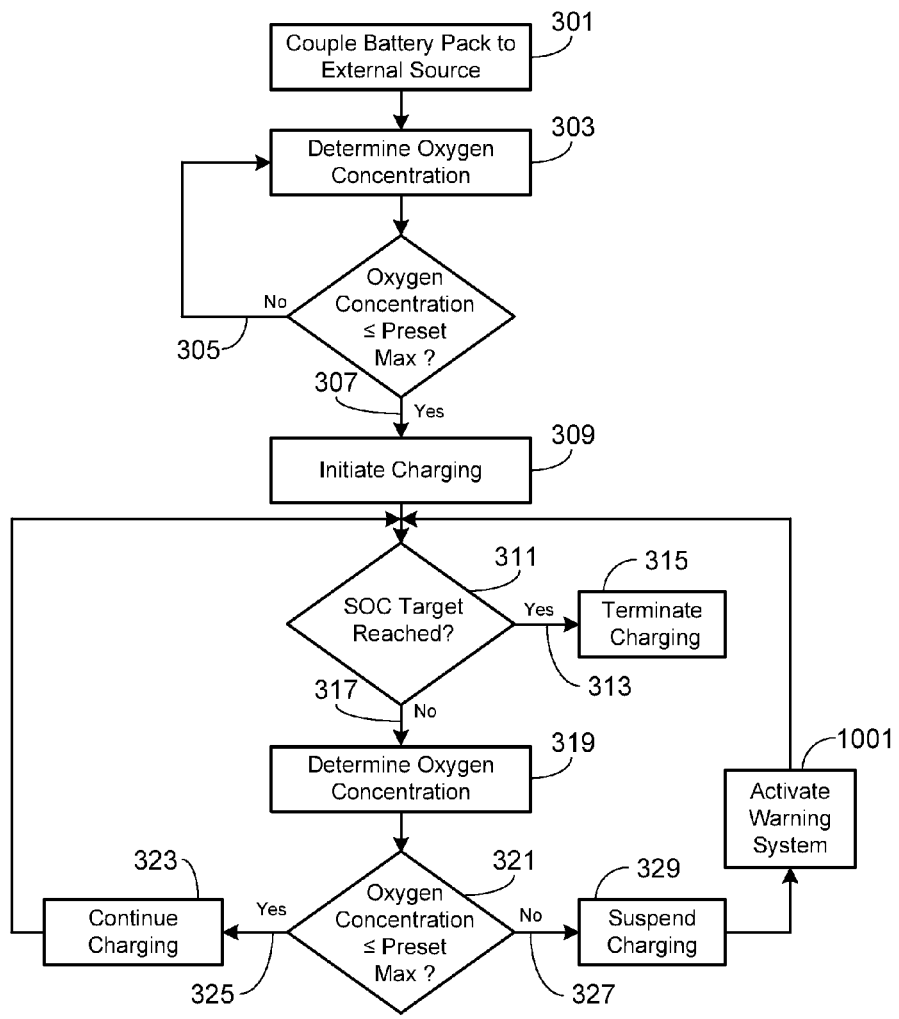
FIG. 10 illustrates an alternate methodology that utilizes the user warning system shown in FIG. 9.

In a modification of the previously described embodiments, controller 115 is also coupled to a user notification system such as a warning light, warning alarm, or other notification means. While it will be understood that this modification may be added to any of the previously described embodiments, an exemplary embodiment is illustrated in FIGS. 9 and 10. FIG. 9 is based on the configuration shown in FIG. 1, but modified to include a warning system 901. It will be appreciated that warning system 901 may be comprised of a visual warning (e.g., warning light on the dash, warning light on a keyfob, flashing headlights, etc.), an auditory warning (e.g., in-dash beeper, honking horn, etc.), automated text message, automated cell phone call, or other warning system. Although warning system 901 may be activated at any desired oxygen concentration, based on the oxygen concentration monitored by one or more of sensors 117-119, preferably it is activated whenever the oxygen concentration is high enough to cause controller 115 to suspend battery pack charging. For example, in the process shown in FIG. 10, based on the process of FIG. 3, whenever the oxygen concentration is greater than the preset maximum value as determined in step 321, charging is suspended (step 329) and the warning system is activated (step 1001). Controller 115 may be configured to activate the warning system for a preset time period (e.g., 1 minute), or to continue operation of the warning system until the oxygen concentration falls below the preset maximum allowed value.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of charging a metal-air battery pack mounted within an electric vehicle, the method comprising the steps of:
coupling said metal-air battery pack to an external charging power source via a battery charging system;
determining an oxygen concentration level within a first region corresponding to said electric vehicle;
comparing said oxygen concentration level to a preset oxygen concentration level;
initiating charging of said metal-air battery pack if said oxygen concentration level is less than said preset oxygen concentration level;
suspending charging of said metal-air battery pack if said oxygen concentration level exceeds said preset oxygen concentration level; and
resuming charging of said metal-air battery pack when said oxygen concentration level falls below said preset oxygen concentration level.

2. The method of claim 1, further comprising the steps of:
determining a present metal-air battery pack state-of-charge (SOC);
comparing said present metal-air battery pack SOC with a target SOC; and
terminating charging of said metal-air battery pack when said present metal-air battery pack SOC reaches or exceeds said target SOC.

3. The method of claim 1, further comprising the steps of:
comparing said oxygen concentration level to a second preset oxygen concentration level, wherein said second preset oxygen concentration level is lower than said preset oxygen concentration level;
charging said metal-air battery pack at a first charge rate if said oxygen concentration level is less than said second preset oxygen concentration level; and
charging said metal-air battery pack at a second charge rate if said oxygen concentration level is greater than said second preset oxygen concentration level and less than said preset oxygen concentration level.

4. The method of claim 1, further comprising the step of activating an auditory warning system if said oxygen concentration level exceeds said preset oxygen concentration level.

5. The method of claim 1, further comprising the step of activating a visual warning system if said oxygen concentration level exceeds said preset oxygen concentration level.

6. The method of claim 1, further comprising the step of activating a notification warning system if said oxygen concentration level exceeds said preset oxygen concentration level.

7. The method of claim 1, further comprising the steps of:
- determining a second oxygen concentration level corresponding to a second region, wherein said first region corresponds to a metal-air battery pack oxygen outlet and said second region corresponds to an external vehicle sensing location;
- comparing said second oxygen concentration level to said preset oxygen concentration level; and
- suspending charging of said metal-air battery pack if said second oxygen concentration level exceeds said preset oxygen concentration level.

8. The method of claim 1, further comprising the steps of:
- determining a second oxygen concentration level corresponding to a second region, wherein said first region corresponds to a metal-air battery pack oxygen outlet and said second region corresponds to an external vehicle sensing location;
- comparing said second oxygen concentration level to a second preset oxygen concentration level; and
- suspending charging of said metal-air battery pack if said second oxygen concentration level exceeds said second preset oxygen concentration level.

9. The method of claim 8, wherein said second preset oxygen concentration level is less than said preset oxygen concentration level.

10. The method of claim 1, wherein said step of determining said oxygen concentration level within said first region further comprises the steps of monitoring a plurality of oxygen concentration levels at a plurality of locations and averaging said plurality of oxygen concentration levels to obtain said oxygen concentration level.

11. The method of claim 1, wherein said step of initiating charging of said metal-air battery pack further comprises the step of applying a charging profile.

12. The method of claim 11, further comprising the step of determining a set of initial charging conditions, wherein said step of applying said charging profile further comprises the step of selecting said charging profile from a plurality of stored charging profiles based on said set of initial charging conditions.

* * * * *